(12) United States Patent
Hong

(10) Patent No.: US 10,664,826 B2
(45) Date of Patent: May 26, 2020

(54) METHOD AND SYSTEM FOR ORDERING FOOD BY USING RFID

(71) Applicant: SK PLANET CO., LTD., Gyeonggi-do (KR)

(72) Inventor: Eun-Soon Hong, Seoul (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 160 days.

(21) Appl. No.: 15/171,694

(22) Filed: Jun. 2, 2016

(65) Prior Publication Data

US 2016/0275484 A1 Sep. 22, 2016

Related U.S. Application Data

(60) Division of application No. 12/617,128, filed on Nov. 12, 2009, now abandoned, which is a continuation of
(Continued)

(30) Foreign Application Priority Data

May 11, 2007 (KR) .......................... 10-2007-0046085

(51) Int. Cl.
*G06Q 20/32* (2012.01)
*G06Q 30/06* (2012.01)
(Continued)

(52) U.S. Cl.
CPC ....... *G06Q 20/3278* (2013.01); *G06Q 20/102* (2013.01); *G06Q 30/06* (2013.01); *G06Q 50/12* (2013.01)

(58) Field of Classification Search
None
See application file for complete search history.

(56) References Cited

U.S. PATENT DOCUMENTS

| 4,516,016 A | 5/1985 | Kodron |
| 6,366,220 B1 | 4/2002 | Elliott |

(Continued)

FOREIGN PATENT DOCUMENTS

| CN | 1798036 | 7/2006 |
| JP | 05-197871 | 8/1993 |

(Continued)

OTHER PUBLICATIONS

Chinese Office Action, dated Dec. 31, 2014.
Japanese Office Action, Japanese Application No. 2016-057309, dated Apr. 19, 2017, pages.

*Primary Examiner* — Ramsey Refai
(74) *Attorney, Agent, or Firm* — Fenwick & West LLP

(57) ABSTRACT

Embodiments relate to ordering food using RFID. Tag information is read from at least one of tags matched to each of multiple products of a menu by using a mobile terminal having a built-in RFID module or an RFID external module. A main server is accessed through a URL corresponding to the tag information. Product information corresponding to the tag information is received by the mobile terminal from the main server. The number of the products are filled out and an order request message is transmitted to the main server by the mobile terminal. The order request message is received and a payment is performed according to the order. An order item is transmitted to a kitchen server by a Point of Sales (POS) server connected to the main server if the payment is completed.

5 Claims, 12 Drawing Sheets

Related U.S. Application Data application No. PCT/KR2008/001961, filed on Apr. 7, 2008.

(51) Int. Cl.
  *G06Q 20/10* (2012.01)
  *G06Q 50/12* (2012.01)

(56) References Cited

U.S. PATENT DOCUMENTS

| | | |
|---|---|---|
| 6,435,406 B1 | 8/2002 | Pentel |
| 6,766,956 B1* | 7/2004 | Boylan, III ............... G06K 7/10 235/462.45 |
| 7,617,132 B2* | 11/2009 | Reade .................. G06Q 20/208 705/26.61 |
| 2002/0006126 A1* | 1/2002 | Johnson ............ H04M 3/42204 370/356 |
| 2002/0099274 A1* | 7/2002 | Isomura ............... A61B 5/0002 600/300 |
| 2002/0118800 A1* | 8/2002 | Martinez ........... H04M 3/42161 379/67.1 |
| 2003/0065565 A1 | 4/2003 | Wagner et al. |
| 2004/0044579 A1* | 3/2004 | Leutze ................... G06Q 30/06 705/15 |
| 2004/0080530 A1* | 4/2004 | Lee ....................... G06T 19/006 715/738 |
| 2004/0143503 A1* | 7/2004 | Suthar ................... G06Q 30/06 705/15 |
| 2004/0158494 A1 | 8/2004 | Suthar |
| 2004/0158499 A1* | 8/2004 | Dev ....................... G06Q 30/02 705/26.1 |
| 2004/0186768 A1* | 9/2004 | Wakim ............. G06F 17/30876 705/14.27 |
| 2005/0065851 A1* | 3/2005 | Aronoff ................. G06Q 30/06 705/15 |
| 2006/0085266 A1* | 4/2006 | Wei ........................ G06Q 10/06 705/15 |
| 2006/0178943 A1* | 8/2006 | Rollinson .......... G06Q 30/0601 705/26.1 |
| 2007/0080784 A1* | 4/2007 | Kim ..................... H04L 63/0492 340/10.1 |
| 2007/0088624 A1 | 4/2007 | Vaughn et al. |
| 2007/0205278 A1 | 9/2007 | Lovett |
| 2008/0033827 A1* | 2/2008 | Kuang ................... G06Q 50/22 705/15 |

FOREIGN PATENT DOCUMENTS

| | | |
|---|---|---|
| JP | 10-241059 | 9/1998 |
| JP | 2001-134673 A | 5/2001 |
| JP | 2002-197542 | 7/2002 |
| JP | 2002-342439 A | 11/2002 |
| JP | 2003-046320 | 2/2003 |
| JP | 2003-052072 A | 2/2003 |
| JP | 2003-076999 | 3/2003 |
| JP | 2003-157477 A | 5/2003 |
| JP | 2003-256526 | 9/2003 |
| JP | 2004-265439 A | 9/2004 |
| JP | 2005-050195 | 2/2005 |
| JP | 2005-267059 A | 9/2005 |
| JP | 2005-531236 A | 10/2005 |
| JP | 2005-309497 | 11/2005 |
| JP | 2006-031398 | 2/2006 |
| JP | 2006-164189 | 6/2006 |
| JP | 2006-260222 | 9/2006 |
| JP | 2006-302218 | 11/2006 |
| JP | 2010-507313 A | 3/2010 |
| KR | 10-2002-0047808 | 6/2002 |
| KR | 10-2006-0008140 | 1/2006 |
| KR | 10-2006-0010045 | 2/2006 |
| KR | 10-2006-0125936 | 12/2006 |
| KR | 10-2008-0041000 | 5/2008 |
| WO | 00/74406 | 12/2000 |
| WO | 2005/051027 | 6/2005 |

\* cited by examiner

METHOD AND SYSTEM FOR ORDERING FOOD BY USING RFID

CROSS-REFERENCE TO RELATED APPLICATIONS

This application is a divisional of U.S. application Ser. No. 12/617,128 filed on Nov. 12, 2009, which is a continuation of Korean PCT Application No. PCT/KR2008/001961 filed on Apr. 7, 2008, and claims the benefit of Korean Application No. 10-2007-0046085 filed on May 11, 2007, with the Korean Intellectual Property Office, the disclosures of which are incorporated herein by reference.

FIELD OF THE INVENTION

The present invention relates to a method for ordering food and performing a payment using local wireless communication, and more particularly to a system and a method for ordering food using RFID in which when a customer selects a menu item and makes a payment for it by using a mobile terminal having a built-in RFID device or an external RFID device, this is registered to a kitchen server and a completion message is transmitted to the mobile terminal when the food is completed, or a menu item ordered by the mobile terminal is simply authorized through a tag stored in the mobile terminal, so that the customer can easily take out the ordered food.

DESCRIPTION OF THE PRIOR ART

Conventionally, a customer should wait for his/her turn in line for ordering food in a fast food restaurant such as McDonald's or Burger King. Therefore, it takes much time for determining and ordering a menu item when the restaurant is crowded, and when the customer is not sure of a previous knowledge for the menu items, so that a next person in line should wait for an even longer time.

Further, even though there is a service worker taking orders at the restaurant, the customer should wait until the service worker helps. Also, when the customer asks to the service worker for additional information on food due to the lack of a thorough explanation on the menu items, it is actually difficult for the service worker to provide the customer with the desired information on all of the menu items.

Furthermore, there is a restaurant providing a take-out service, such as a fast food restaurant, remodeled and equipped with a system enabling a driver to order food and make a payment without getting out of the car. In this case, even though it is possible for the driver to determine the menu item and make a payment for it in the car, it takes a little time for performing the payment after determining the menu item and preparing the food so that, disadvantageously, the driver should wait for a long time in the car.

SUMMARY OF THE INVENTION

Therefore, the present invention has been made in view of the above-mentioned problems, and an object of the present invention provides a method and a system for ordering food using RFID in which a tag is assigned to a menu item so that a customer can easily select a desired menu item by a mobile terminal and immediately make a payment for it.

Another object of the present invention provides a method and a system for ordering food using RFID in which a customer orders a menu item by a mobile terminal prior to arriving at a restaurant and simultaneously location information and tag information are provided, the food is prepared according to when the customer using the mobile terminal is supposed to arrive at the restaurant, and authorization is easily performed through the tag information built in the mobile terminal when the customer arrives at the restaurant, so that the customer can take out the ordered food.

In accordance with an aspect of the present invention, there is provided a method for ordering food using RFID, including the steps of: i) reading tag information corresponding to one of tags matched to each of multiple products of a menu by using a mobile terminal having a built-in RFID module or an RFID external module; and ii) accessing a main server through a URL corresponding to the tag information by the mobile terminal and receiving product information corresponding to the tag information from the main server to the mobile terminal.

In accordance with another aspect of the present invention, there is provided a method for ordering food using RFID, including the steps of: a) reading tag information from at least one of tags matched to each of multiple products of a menu by using a mobile terminal having a built-in RFID module or an RFID external module; b) accessing a main server through a URL corresponding to the tag information and receiving product information corresponding to the tag information from the main server to the mobile terminal; c) filling out the number of the products and transmitting an order request message to the main server by the mobile terminal; d) receiving the order request message and performing a payment according to the order; and e) transmitting an order item to a kitchen server by a Point of Sales (POS) server connected to the main server if the payment is completed.

In accordance with another aspect of the present invention, there is provided a method for ordering food using RFID, including the steps of: 1) accessing a main server through a communication network, selecting a menu item, and performing a payment so as to complete an order by a mobile terminal; 2) transmitting tag information and location information to the main server by the mobile terminal; 3) calculating an expected arrival time based on the location information and authorizing a user based on the tag information by the main server; 4) transmitting information on the order, the expected arrival time, and the tag information to a Point Of Sales (POS) server if the authorization of the user is completed; and 5) reading the tag information stored in the mobile terminal through an RFID reader connected to the POS server, comparing the tag information provided from the main server with the tag information read from the mobile terminal by the POS server, and authorizing if the tag information corresponds to each other.

In accordance with another aspect of the present invention, there is provided a system for ordering food using RFID, including: a main server for storing and managing product information corresponding to tag information of an RFID so as to provide it to the mobile terminal, performing a payment according to a product order of the mobile terminal, and transmitting a payment result to a POS server; and the POS server for transmitting order information according to the payment result received from the main server to a kitchen server.

In accordance with another aspect of the present invention, there is provided a system for ordering food using RFID, including: a main server for providing a mobile terminal accessed through a communication network with a menu, providing a payment screen according to selecting a menu item, calculating an expected arrival time based on location information received from the mobile terminal, authorizing a user based on tag information, and transmitting information on the order, the expected arrival time, and the tag information to a POS server if the user authorization is completed; and the POS server for receiving the tag information stored in the mobile terminal read through an RFID reader, comparing the tag information provided from the main server with the tag information read from the mobile terminal so as to determine the authorization.

In the meantime, according to a method for remotely ordering food using RFID of the present invention, it is possible for the user to select the neighboring franchised restaurant using location information of the terminal.

In accordance with another aspect of the present invention, there is provided a method for remotely ordering food using RFID, including the steps of: a) driving an application for a remote order by a mobile terminal and transmitting its location information to a main server; b) displaying a menu item and a franchised restaurants list corresponding to the location information when a menu item provided by the application is selected; c) displaying location information of the franchised restaurant on the mobile terminal when the mobile terminal selects the franchised restaurant in the franchised restaurants list; d) transmitting subscriber information stored in an RFID tag of the mobile terminal and the order item to a POS terminal through the main server when a payment request message for the menu item is transmitted to the mobile terminal and the payment is completed; and e) reading, by the POS terminal, the subscriber information from the RFID tag, comparing it with subscriber information stored in the POS terminal, and if the subscriber information corresponds to each other, displaying an accept message for providing a product corresponding to the order item on the POS terminal.

In accordance with another aspect of the present invention, there is provided a method for remotely ordering food using RFID, including the steps of: i) driving an application for a remote order and selecting a menu item by a mobile terminal; ii) performing a payment on the menu item by a main server receiving information on selection of the menu item and a franchised restaurant; iii) receiving, by the main server, location information of the mobile terminal from a location positioning server and providing the location information to the mobile terminal, and displaying a franchised restaurants list corresponding to the location information on the mobile terminal; iv) displaying the location information of the franchised restaurant on the mobile terminal if the mobile terminal selects the franchised restaurants in the franchised restaurants list; v) transmitting, by the main server, subscriber information stored in an RFID tag of the mobile terminal and the order item to a POS terminal; and vi) reading the subscriber information from the RFID tag, comparing it with the subscriber information stored in the POS terminal, and displaying a result of the comparison on the POS terminal by the POS terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings.

First Exemplary Embodiment

Figure 1:
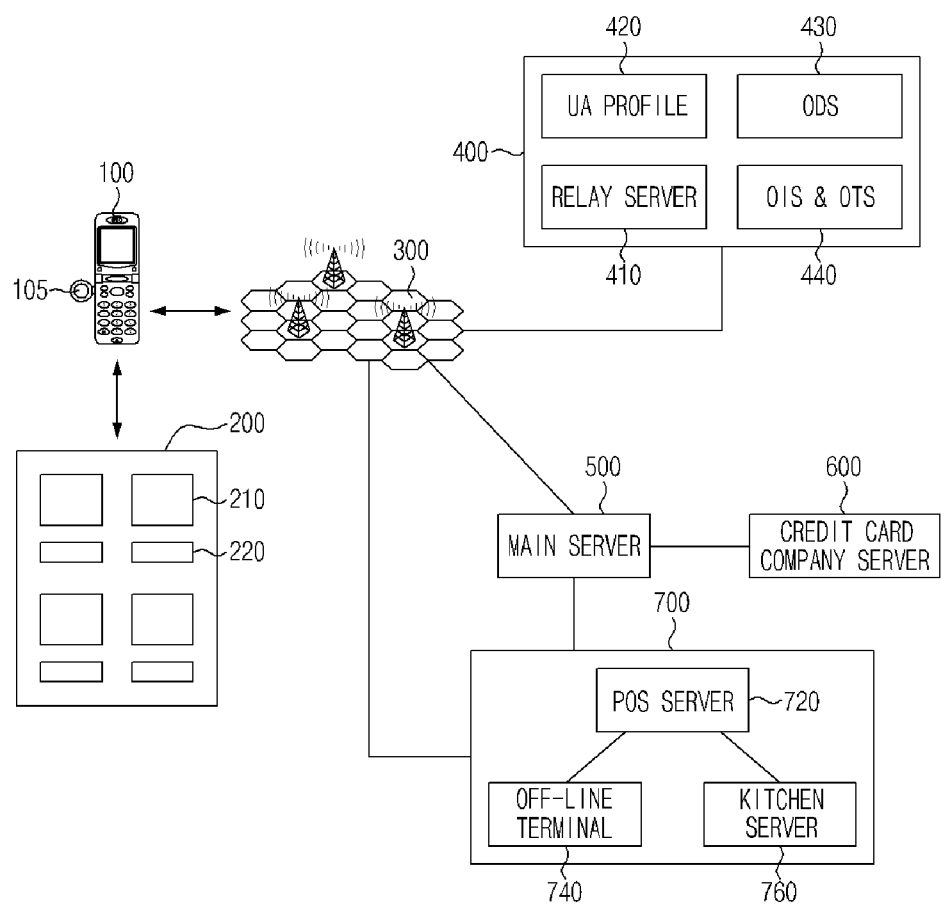
FIG. 1 is a diagram illustrating a system for ordering food using RFID according to a first exemplary embodiment of the present invention.

FIG. 1 is a diagram illustrating a system for ordering food using RFID according to a first exemplary embodiment of the present invention.

RFID is one field of an auto-ID, such as bar information, magnetic stripes, and an IC-Card, which employs a method of wirelessly identifying information of an object using radio frequency.

A principle of the RFID is to receive tag information including information of a corresponding object through an antenna so as to use the tag information for obtaining the information on the corresponding object, which uses an electric wave. Therefore, the RFID is resistant to an environmental influence, can be identified at a high speed and at a remote distance, and a unique information number is assigned to a tag during manufacturing of the tag, thereby preventing counterfeiting.

A system for ordering food using the RFID according to a first exemplary embodiment of the present invention provides a system by which a user entering a fast food restaurant or a restaurant can order the food, i.e. a product, using the RFID. The system includes a mobile terminal 100, a mobile communication network 300, an RFID system 400, a main server 500, a credit card company server 600, and a Point of Sales (POS) system 700.

The mobile terminal 100 reads a tag 220 provided to a menu item 200 while being connected to a built-in RFID module or an external RFID device (so-called a round 105).

The mobile terminal 100 transmits the read information of the tag 220 to the RFID system 400 through the mobile communication network 300, a relay server 410 of the RFID system 400 transmits the tag information received from the mobile terminal 100 to a User Agent Profile (UA profile) 420 so as to authorize a subscriber, and when the authorization is completed in the UA profile 420, the tag information is provided to an Object Directory Service (ODS) server 430.

The ODS server 430 manages an Object Identification Service (OIS) address corresponding to the tag information and a service URL and provides the OIS address and service URL to the relay server 410.

The relay server 410 access the OIS and an Object Tracking Service (OTS) through the OIS address and inquires information related to the tag information. Here, an example of the information related to the tag information is the tag issuance, the tag discard, events that occurred during the distribution, or the like.

The relay server 410 provides service URL information obtained from the ODS server 430 to the mobile terminal. Here, the service URL information is an URL of the main server 500 storing information on the food, i.e. the product corresponding to the tag information, and is transmitted to the mobile terminal 100.

The main server 500 stores and manages the product information corresponding to the tag information of the RFID so as to provide it to the mobile terminal 100, performs the payment according to the product order by the mobile terminal 100, and transmits the payment result to a Point Of Sales (POS) server 720.

For example, the main server 500 is a center management server of the fast food restaurant, such as McDonald's or Burger King and is connected to the POS system 700 of a branch restaurant.

The main server 500 transmits a payment methods list to the mobile terminal 100. When the mobile terminal selects and requests a payment of a payment amount being added to a charge of the mobile terminal 100 in the payment methods list, the main server 500 transmits a payment amount according to the order item to an accounting server (not shown) of the mobile terminal 100.

If the main server 500 receives a registration notice message of the payment amount from the accounting server, the main server 500 assigns an order number to the order item and transmits the order item, the order number, and a phone number of the mobile terminal to the POS server 720 of the POS system 700.

If the mobile terminal 100 requests a cash payment in the payment methods list transmitted from the main server 500, the main server 500 transmits the order number corresponding to the order item together with the order list to the POS server 720 and the mobile terminal 100 at the same time. Therefore, payment completion information indicating that the user of the mobile terminal 100 completes the cash payment through an OFF-Line terminal 740 of the POS system 700 is registered, and the main server 500 transmits the payment completion information to the POS server 720.

If the mobile terminal 100 requests a card payment in the payment methods list transmitted from the main server 500, it is inquired whether a card payment history of the mobile terminal 100 is stored in memory of the mobile terminal 100 or the main server 500. If the card payment history is stored, the main server 500 reads the information of the card, identifies the user, and performs the payment. The main server 500 is linked with the credit card company server 600 so as to identify the user, and transmits the payment information to the credit card company server 600 after completing the payment.

At this time, if the card payment history is not stored or if the user wants to make the payment with another card, the main server 500 provides a WAP page for inputting information of another card on a payment screen of the mobile terminal 100, and authorizes the card while being connected to the credit card company server.

At least one POS system 700 linking with the main server 500 includes the POS server 720, the Off-Line terminal 740, and the kitchen server 760.

The POS server 720 transmits the order information according to the payment result received from the main server 500 to the kitchen server 760.

The POS server 720 lists up the order items through the mobile terminal 100 and the OFF-Line terminal 740 in a time sequence of the payment completion, manages them in total, and transmits the order list to the kitchen server 760 so as to make the food to be prepared.

The kitchen server 760 adds an order waiting state item on the order list received from the POS server 720 so as to display it on the screen. When the product according to the order, i.e. food, is completed, the order waiting state item is changed to an order completion item to be registered, and the kitchen server 760 transmits a guide message informing the order completion of the food to the POS server 720. Then, the POS server 720 transmits the guide message to the mobile terminal 100 through the mobile communication network 300, and when the user of the mobile terminal 100 receives the food, the order information is deleted on the order list. The guide message includes a text message, a voice message, a multimedia message including at least one text, image, and moving picture.

The operation of the present invention configured according to the first exemplary embodiment of the present invention will be described in more detail.

The tag information is read from at least one tag 220 matching to each of a plurality of products of the menu 200 using the mobile terminal 100 having the built-in RFID module or the external RFID device S310.

The mobile terminal 100 transmits the tag information to the RFID system 400, obtains the URL information of the main server 500 storing and managing the product information corresponding to the tag information from the RFID system 400, and accesses the main server 500.

Figure 5:
FIGS. 5 to 9 are diagrams illustrating examples of a WAP page provided to a mobile terminal.

The main server 500 transmits the product information corresponding to the tag information to the mobile terminal 100 S320. As shown in FIG. 5, the product information includes at least one of a product name, a product price, the place of origin, ingredients used in the product, and total calories if the product is food.

When the mobile terminal 100 fills out the number of the product and transmits an order request message to the main server 500, the main server 500 performs the payment according to the payment request S330 and S340.

There are three payment methods performed in the main server 500 as follows.

First, when the mobile terminal 100 selects the cash payment in the payment methods list, the order number corresponding to the order item are transmitted together with the order item to the POS server 720 and the mobile terminal 100, and when the user of the mobile terminal 100 receiving the order number makes the cash payment, the payment completion information is registered to the POS server 720 and the main server 500.

Figure 6:
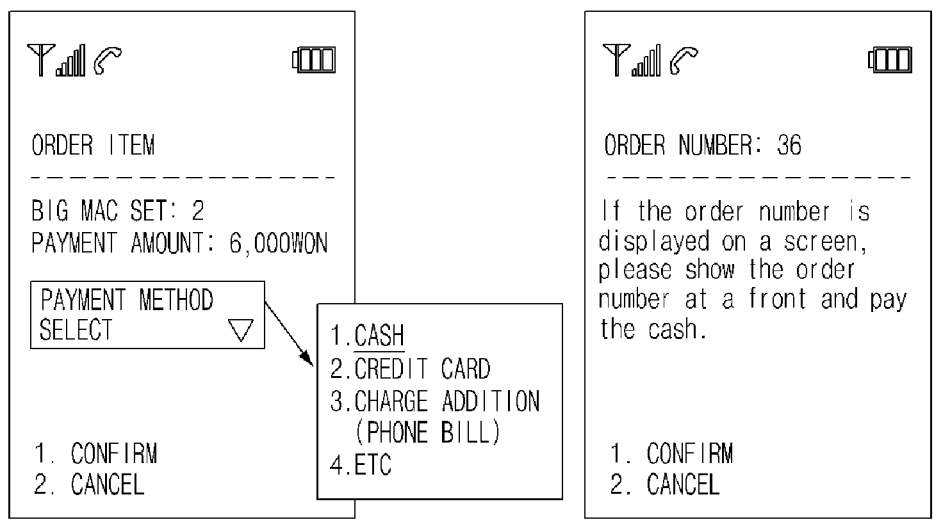

As shown in FIG. 6, a window for selecting the payment method is popped up on a screen of the mobile terminal 100, and if an item [1. cash] is selected in the popped-up window, the guide message is displayed on the screen of the mobile terminal 100 together with the order number.

Figure 7:
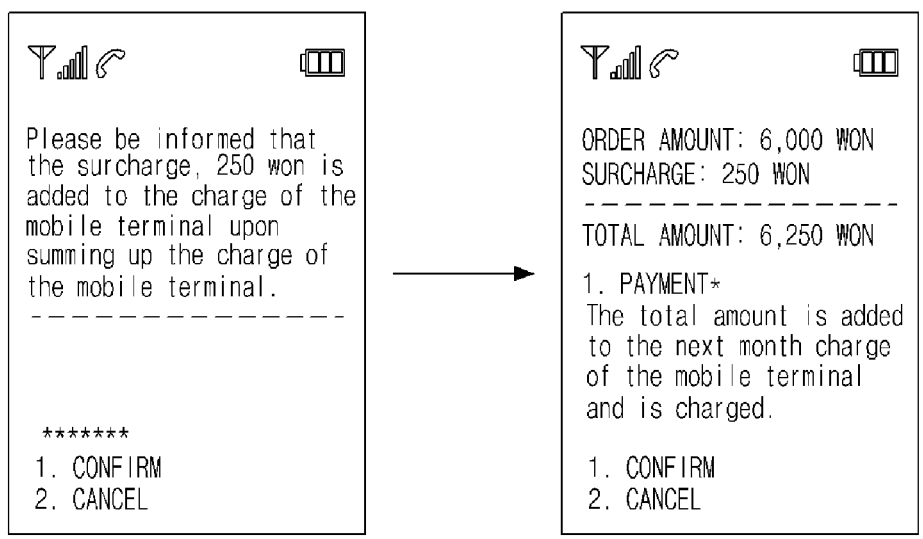

Second, the mobile terminal 100 selects a phone bill of a payment amount being added on the charge of the mobile terminal 100 in the payment methods list received from the main server 500, the main server 500 transmits the payment amount of the order item to the accounting server of a mobile communication company to which the mobile terminal 100 belongs. Referring to FIG. 7, the WAP page authorizing for identifying a service charge added when the payment amount is summed up to the charge of the mobile terminal and the person in question is displayed on the screen of the mobile terminal 100.

At this time, the main server 500 receives a message informing the registration of the payment amount from the accounting server, assigns the order number to the order item, and transmits the order item, order number, phone number of the mobile terminal to the POS server 720, so as to make the food corresponding to the order item to be prepared.

Figure 8:
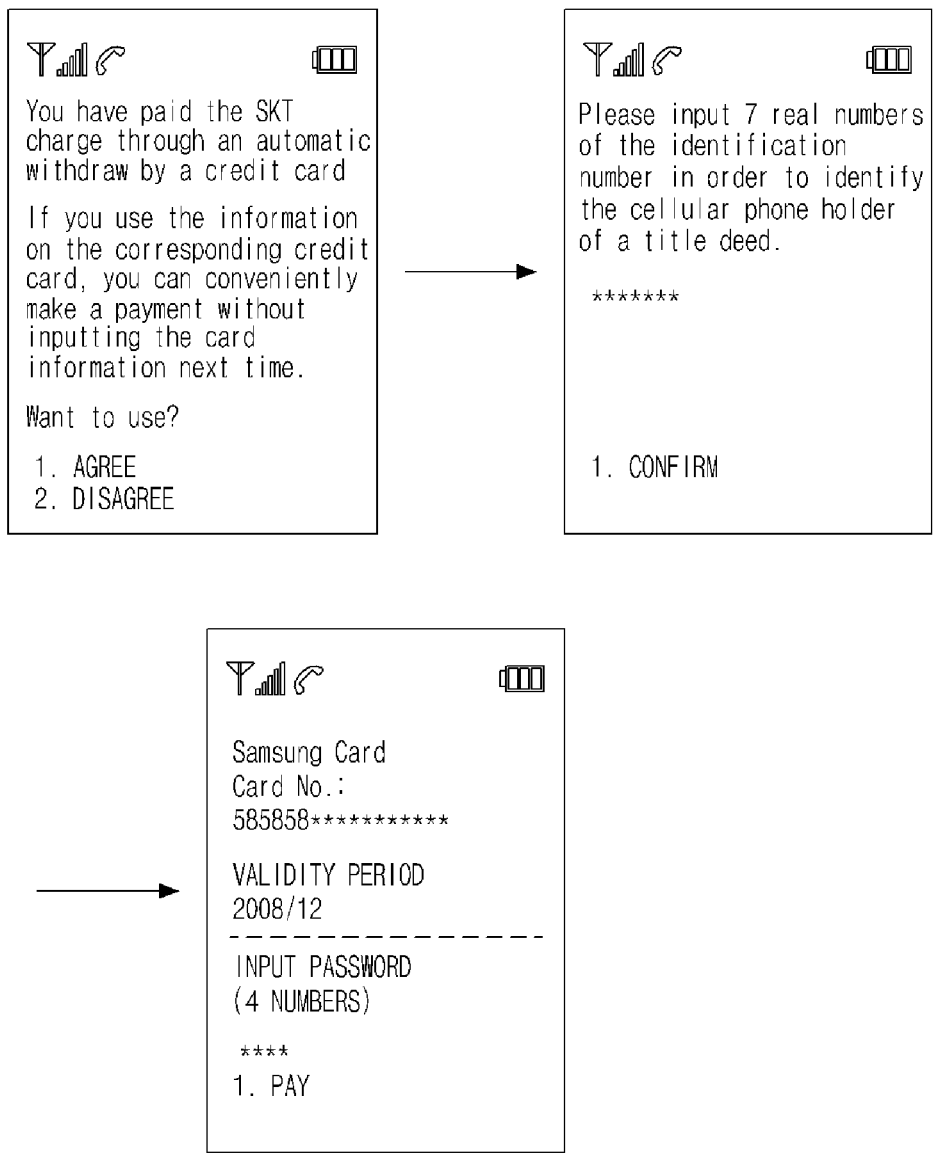

Third, when the mobile terminal 100 selects the card payment in the payment methods list, it is inquired whether the card payment history of the mobile terminal 100 is stored in the memory of the mobile terminal 100 or the main server 500. If the card payment history is stored, the card information is read and the payment is performed after identifying the user. FIG. 8 illustrates the WAP page implemented to display the information on the credit card on the screen of the mobile terminal because the credit card used for paying the charge of the mobile terminal is stored in the main server, authorize the user, and make the payment.

Figure 9:
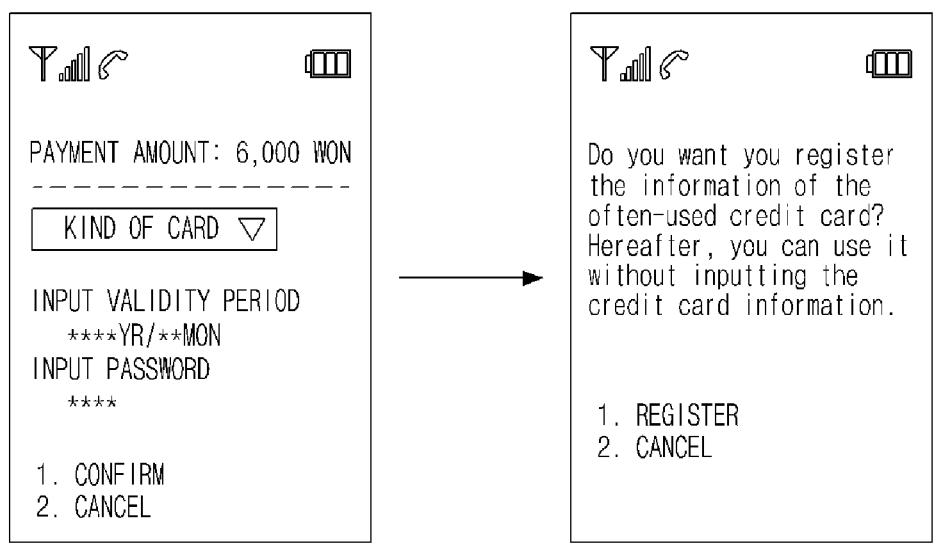

However, as shown in FIG. 9, if the card payment history is not stored or if the user wants to pay with another card, the user inputs the card information on the payment screen of the mobile terminal 100. If the result of the authorization performed by the credit card company server is authorization, the order item and the phone number of the mobile terminal 100 are transmitted to the POS server 720.

When the payment is completed through one of three methods, the POS server 720 connected to the main server 500 transmits the order item to the kitchen server 760 S350. For example, when the payment for the order is completed or the order is requested, the order number is generated and the generated order number are transmitted together with the order item between the POS server 720, kitchen server 760, and the mobile terminal 100.

The order item is displayed on the screen of the kitchen server 760 together with the [order waiting] item, and when the product, i.e. the food, is completed and the order completion is registered to the kitchen server 760, the order completion message is transmitted to the POS server 720, and the POS server 720 displays the order number on a display unit or transmits the order completion message to the mobile terminal 100 S360 and S370.

If the order items through the mobile terminal 100 and the OFF-Line terminal 740 are registered to the POS server 720, the POS server 720 lists up the order item in a time sequence of the payment completion, manages them in total, and periodically transmits the order list to the kitchen server 760.

Before the kitchen server 720 transmits the order completion state to the mobile terminal 100, it is possible that the mobile terminal 100 transmits the message requesting the cancel or change of the order item to the POS server 720.

The main server 500 transmits a message inquiring the additional order to the mobile terminal 100. When an additional order request is received from the mobile terminal 100, the main server 500 transmits the WAP page according to the additional order request to the mobile terminal 100.

Second Exemplary Embodiment

Figure 2:
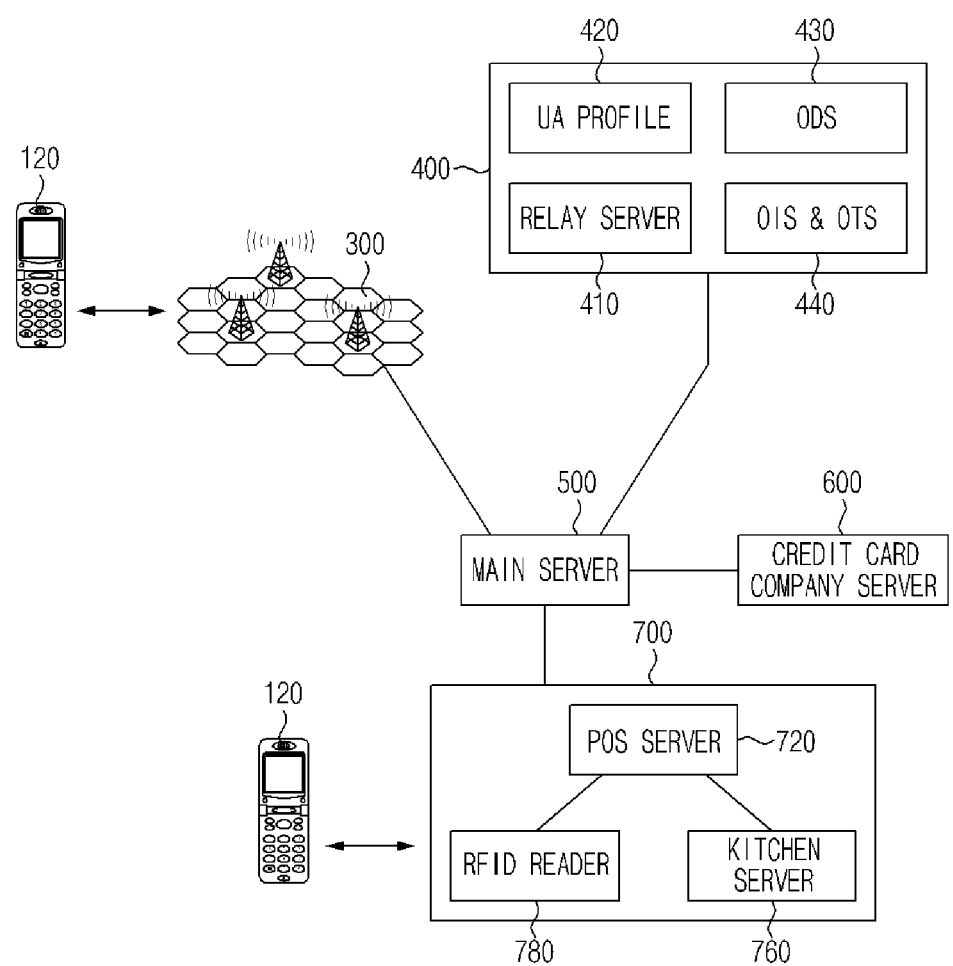
FIG. 2 is a diagram illustrating a system for ordering food using RFID according to a second exemplary embodiment of the present invention.
Figure 3:
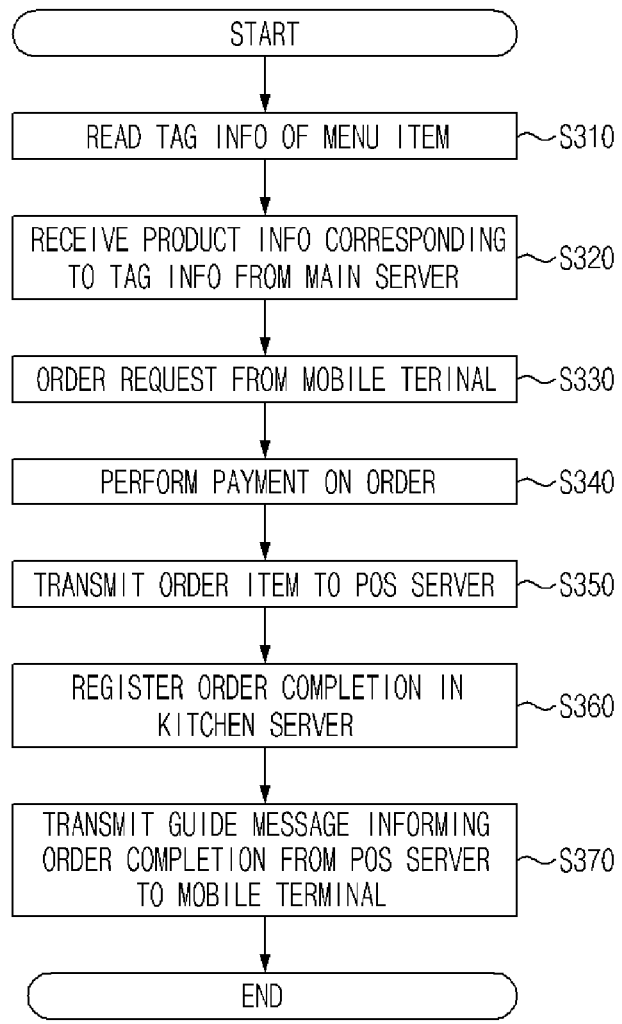
FIGS. 3 and 4 are flowcharts illustrating a method for ordering food using RFID according to first and second exemplary embodiments of the present invention, respectively.
Figure 4:
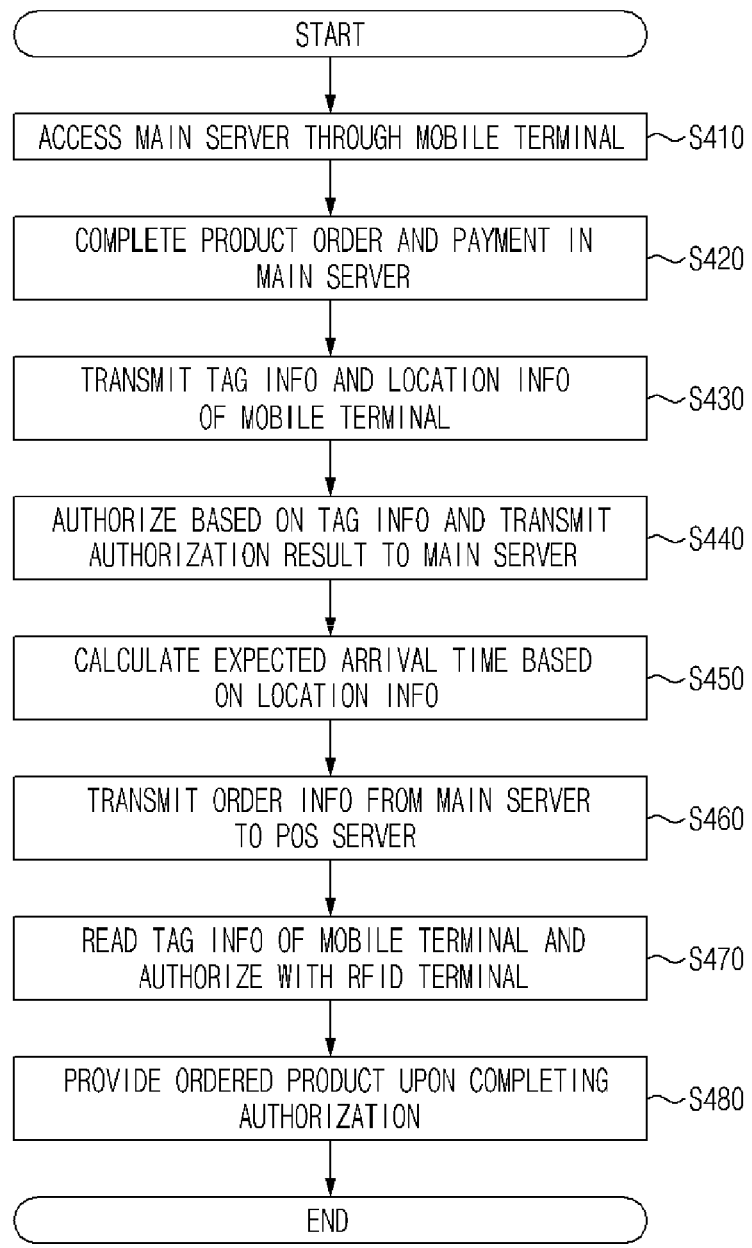

FIG. 2 is a diagram illustrating a system for ordering food using RFID according to a second exemplary embodiment of the present invention.

The system for ordering food using the RFID according to a second exemplary embodiment of the present invention is a system implemented to order the food and make a payment for it in advance before the user desiring the take-out arrives at the fast food restaurant or the restaurant, and authorize the user within a short time using the tag built-in the mobile terminal when the user arrives, so as to enable the user to take out the ordered food.

The system for ordering food includes the construction elements similar to those of the first exemplary embodiment, but the construction of the POS system 700 is different from that of the first exemplary embodiment.

Further, the mobile terminal 120 according to the second exemplary embodiment stores unique tag information and it is not necessary for the mobile terminal 120 to include a built-in or an external RFID device reading the tag, like the first exemplary embodiment.

The main server 500 provides the mobile terminal 120 with a menu for ordering the food, provides the payment screen according to selecting the menu item, calculates an expected arrival time based on location information received from the mobile terminal 120, and performs the user authorization based on the tag information. If the user authorization is completed, the main server 500 transmits the information on the order, the expected arrival time, and the tag information to the POS server 720.

For example, when the mobile terminal 100 accessing the main server 500 transmits the tag information and the location information, the main server 500 transmits the tag information to the RFID system 400, authorizes the mobile terminal 120 based on the tag information, and receives the authorization result from the RFID system 400. That is, the main server 500 authorizes the mobile terminal 120 and then transmits the WAP page related to the product order to the mobile terminal 120.

The POS system 700 includes the POS server 720, an RFID reader 780 reading the tag information stored in the mobile terminal 120, and the kitchen server 760.

The RFID reader 780 is resistant to an environmental influence and can recognize the RFID at a high speed. Therefore, for example, if the user of the mobile terminal 100 orders the menu item while driving and arrives at the fast food restaurant or the restaurant, the RFID reader 780 can read the tag information stored in the mobile terminal 120 without the user getting out of the car.

The POS server 720 compares the tag information transmitted from the RFID reader 780 with the tag information provided from the main server 500 and determines the authorization. If it is determined to be authorized, the POS server 720 transmits the order information to the kitchen server 760.

The function of the kitchen server 760 is identical to that of the first exemplary embodiment, so the description thereof will be omitted. Further, the payment method according to the order of the user in the main server 500 is identical to that of the first exemplary embodiment, so the description thereof will be omitted.

The operation of the present invention configured according to the second exemplary embodiment of the present invention will be described in more detail.

The mobile terminal 120 accesses the main server 500 through the mobile communication network 300 before the user arrives at the fast food restaurant or the restaurant equipped with the POS system 700 S410.

At this time, the mobile terminal 120 accesses the main server 500 through the mobile communication network 300, selects the menu item, and makes the payment for it so that the order is completed S420. The payment method through the main server 500 is identical to that of the first exemplary embodiment so the description thereof will be omitted.

The mobile terminal 120 completing the payment transmits the unique tag information and location information of the mobile terminal 120 to the main server 500 S430.

The main server 500 calculates the expected arrival time based on the location information and authorizes the user based on the tag information S440. For a practical example, the expected arrival time can be registered to the main server 500 by the mobile terminal 120.

When the user authorization is completed, the main server 500 transmits the order information, the expected arrival time, and the tag information to the POS server and the POS server 720 transmits the order information to the kitchen server 760 so as to make the food according to the order information to be prepared in the kitchen S450 and S460.

When the order completion is registered to the kitchen server 760, the order completion message is registered to the POS server 720 and is transmitted to the mobile terminal 120.

The tag information stored in the mobile terminal 120 is read through the RFID reader 780 connected to the POS server 720 and the POS server 720 compares the tag information provided from the main server 500 and the tag information read from the mobile terminal 120. If the information corresponds to each other, the POS server 720 authorizes the user and provides the user of the mobile terminal 120 with the completed product, i.e. the food, S470 and S480.

Third Exemplary Embodiment

Figure 10:
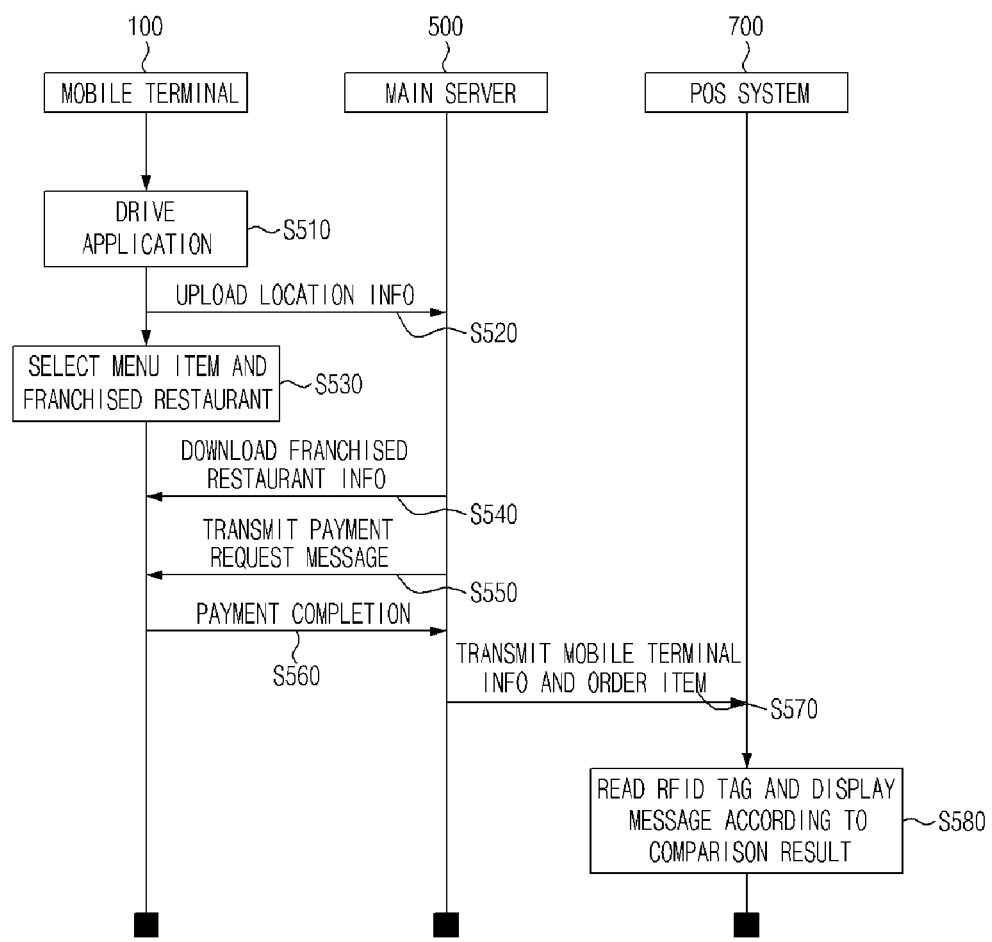
FIG. 10 is a flowchart illustrating a method for remotely ordering food using RFID according to a third exemplary embodiment of the present invention.

FIG. 10 is a flowchart illustrating a method for remotely ordering food using RFID according to a third exemplary embodiment of the present invention. According to FIG. 10, the user also can select a neighboring franchised restaurant using the location information of the mobile terminal.

Here, the mobile terminal 120 according to the second exemplary embodiment stores unique tag information and it is not necessary for the mobile terminal 120 to include the built-in or external RFID device reading the tag, like the first exemplary embodiment.

The mobile terminal 120 drives an application for the remote order and transmits its location information to the main server S510 and S520. If the mobile terminal 120 does not have the application or needs to be version-updated, the mobile terminal 120 downloads the application from the main server 500.

When the mobile terminal 120 selects the menu item provided by the application, the menu item and a the franchised restaurants list corresponding to the location information are displayed on the screen of the mobile terminal 120 S530.

As a practical example, when one restaurant in the franchised restaurants list is selected, sub-menu items corresponding to the franchised restaurants are displayed, and when one of the sub-menu items is selected, the payment request message is transmitted to the mobile terminal 120.

As another practical example, when the mobile terminal 120 selects the franchised restaurant in the franchised restaurants list, the location information of the franchised restaurant is displayed on the screen of the mobile terminal 120. At this time, if the location information of the franchised restaurant is not stored in the mobile terminal 120, the main server 500 provides the location information of the franchised restaurant S540.

When the main server 500 transmits the payment request message for the menu item to the mobile terminal 120 and the payment is completed S550 and S560, the main server 500 transmits subscriber information stored in the RFID tag of the mobile terminal 120 and the order item to the POS system 700 S570.

The subscriber information includes at least one of a Mobile Identification Number (MIN) and Mobile Directory Number (MDN) of the mobile terminal.

The POS system 700 reads the subscriber information from the RFID tag and compares it with the subscriber information received from the main server 500. If the subscriber information corresponds to each other, an accept message of providing the product corresponding to the order item is displayed on the screen of the POS system 700 and the accept message is also provided to the mobile terminal 120 in the practical example S580.

Further, when the payment is completed, the main server 500 calculates the expected arrival time based on the location information of the mobile terminal 120 and the franchised restaurant so as to transmit it to the POS system 700, and the location information of the franchised restaurant is displayed as a map on the screen of the mobile terminal 120. Further, if the mobile terminal 120 requests a road guide service through the main server 500, the main server 500 provides a route from the location of the mobile terminal 120 to the franchised restaurant.

It is possible that the main server 500 receiving a preparation complete message of the product corresponding to the menu item from the POS system 700 transmits the preparation complete message to the mobile terminal 120.

Fourth Exemplary Embodiment

Figure 11:
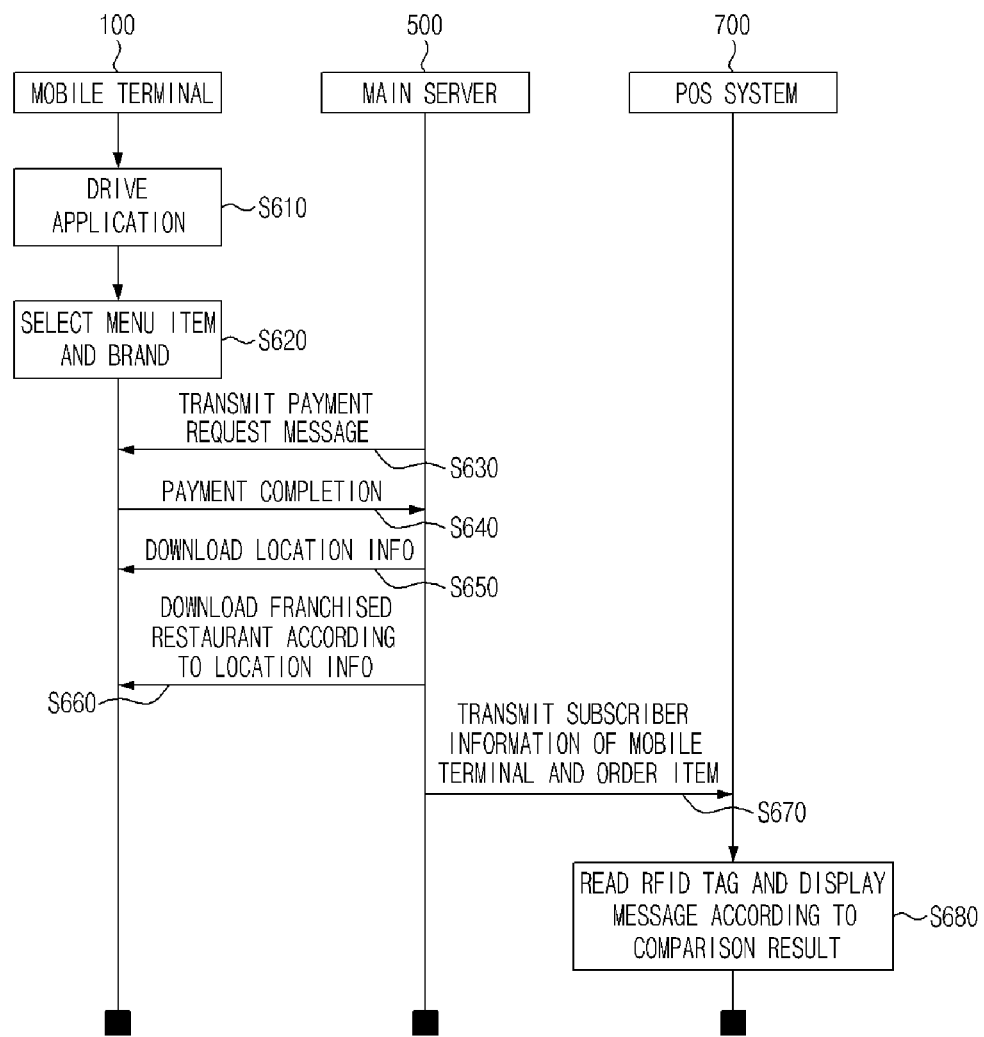
FIG. 11 is a flowchart illustrating a method for remotely ordering food using RFID according to a fourth exemplary embodiment of the present invention.
Figure 12:
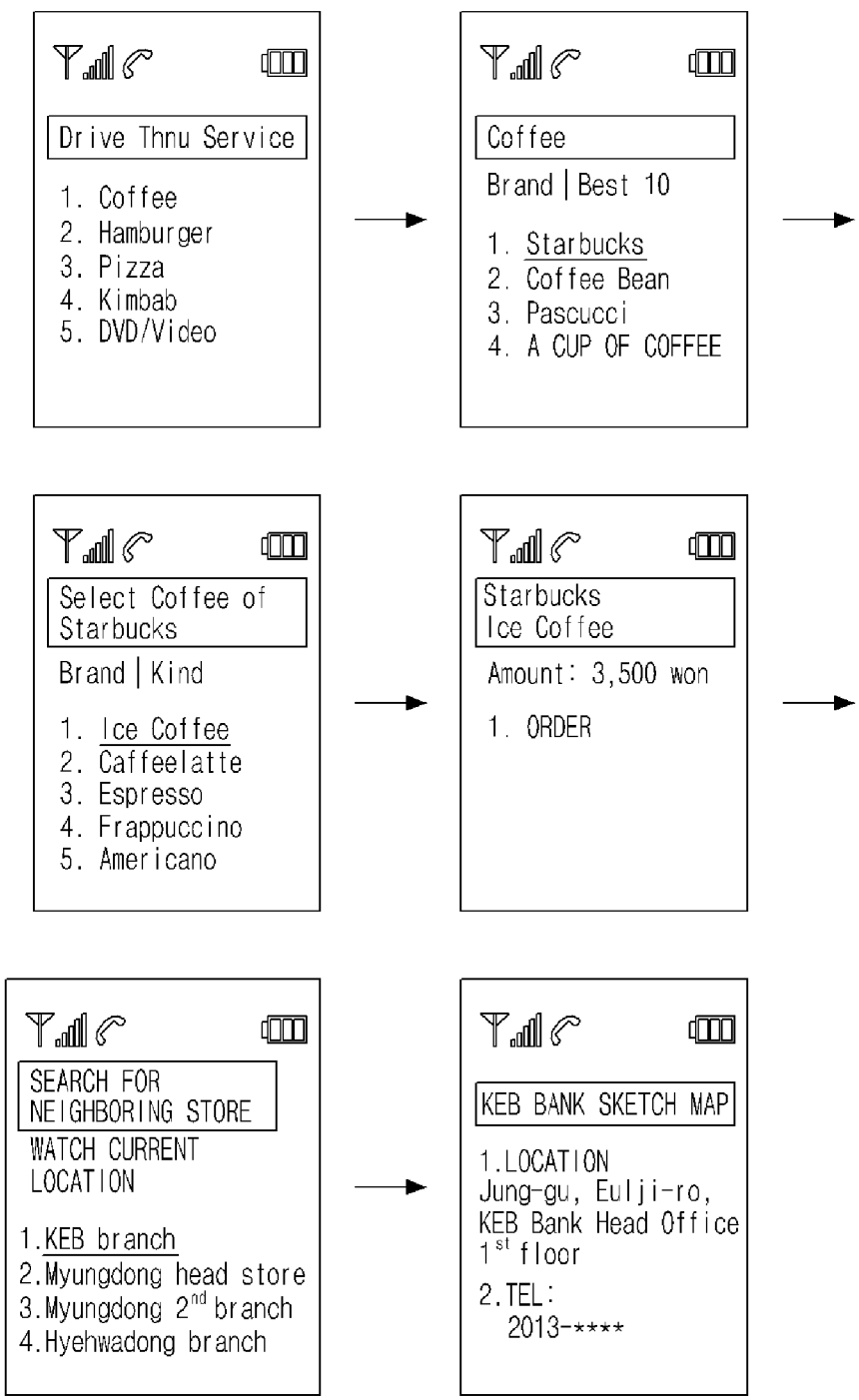
FIG. 12 is a diagram illustrating a WAP page displayed on a mobile terminal for performing the remote order according to third and fourth exemplary embodiments of the present invention.

FIG. 11 is a flowchart illustrating a method for remotely ordering food using RFID according to a fourth exemplary embodiment of the present invention and FIG. 12 is a diagram illustrating a WAP page displayed on a mobile terminal. In FIG. 11, it is possible to use the information of the franchised restaurant by using the location information of the mobile terminal as in FIG. 10.

Referring to FIGS. 11 and 12, the mobile terminal 120 drives the application for the remote order and selects the menu item and a brand prior to arriving at the franchised restaurant of the fast food restaurant or the restaurant equipped with the POS system 700 S610 and S620.

FIG. 12 specifically illustrates an example of the screen for selecting the menu item and brand. Here, the user selects a kind of food, such as coffee, a hamburger, or the like. When the user selects the coffee, the user selects the brand of coffee. Then, if the user selects the brand Starbucks, the list of the menu item provided from the brand Starbucks is displayed so that the user selects the menu item in the displayed list again. The method of selecting the menu item is merely an example, and is not limited the above method.

Returning to FIG. 11, the menu item and the information of the franchised restaurant selected by the mobile terminal 120 are transmitted to the main server 500 through the mobile communication network 300, and the main server 500 transmits the payment request message corresponding to the selection to the mobile terminal 120 so as to perform the payment S630 and S640.

After the payment is completed, the main server 500 measures the location information of the mobile terminal 120 using a location positioning server (not shown) and then downloads the location information to the mobile terminal S650. Then, the main server 500 downloads the information of the franchised restaurant corresponding to the location information S660.

Then, the franchised restaurants list corresponding to the location information is displayed on the mobile terminal 120. If the mobile terminal 120 selects the franchised restaurant in the franchised restaurants list, the location information of the franchised restaurant is displayed on the mobile terminal 120.

Further, as the mobile terminal 120 selects the franchised restaurant, the main server 500 transmits the subscriber information stored in the RFID tag of the mobile terminal 120 and the order item to the POS system 700 S670.

The POS system 700 reads the subscriber information from the RFID tag, compares it with the subscriber information stored in the POS system 700, and displays the result of the comparison on the POS system 700. As a practical example, the comparison result is provided to the mobile terminal 120 S680.

The main server 500 calculates the expected arrival time based on the location information and authorizes the user based on the tag information. As a practical example, the expected arrival time can be registered to the main server 500 by the mobile terminal 120.

When the user authorization is completed, the main server 500 transmits the order information, the expected arrival time, and the tag information to the POS system 700, and the POS system 700 transmits the order information to the kitchen server so as to make the food corresponding to the order information to be prepared.

If the completion of the order is registered to the kitchen server, the order completion message is registered to the POS system 700 and then is transmitted to the mobile terminal 120.

The POS system 700 reads the tag information stored in the mobile terminal 120 through the RFID reader connected to the POS system 700, compares the subscriber information transmitted from the main server 500 with the tag information read from the mobile terminal. If the information corresponds to each other, the POS system 700 authorizes the user and provides the user of the mobile terminal 120 with the completed product, i.e. the food.

As described above, according to the method and the system for ordering food using RFID of the present invention, there is not needed for the customer to wait for ordering the food at the fast food restaurant such as McDonald's or Burger King, it is possible to obtain information on the menu item prior to ordering the menu item as much as the customer desires, and it is possible to make a payment through the mobile terminal, thereby improving the user's convenience.

Further, at the restaurant where a customer can take out food, such as the fast food restaurant, the customer can order the desired food through the mobile terminal prior to arriving at the restaurant and make the payment as desired, so that advantageously the customer can immediately take out the food upon arriving at the restaurant.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for ordering food item, comprising:
    i) reading tag information corresponding to one of tags in a menu by an antenna of a Radio-Frequency Identification (RFID) module, each of the tags representing a food item on the menu;
    ii) transmitting, by a mobile terminal, the tag information to an Object Directory Service (ODS) server to cause the ODS server to provide Object Identification Service (OIS) address and a service Uniform Resource Locator (URL) to a relay server, and to cause the relay server to provide the service URL to the mobile terminal;
    iii) accessing, by the mobile terminal, a main server through the service URL to receive the information of a food item corresponding to the tag information from the main server;
    iv) sending, by the mobile terminal, an order request message based on the received information of the food item, to the main server to cause:
        the main server to transmit order information to a point of sale (POS) system, and
        the POS system to generate an order list including the food item according to a sequence in which payment is completed and send the order list to a kitchen server for preparation of the food item;
    v) receiving, by the mobile terminal, the order list from the POS system for display on the mobile terminal; and
    vi) receive a guide message indicating completion of one or more food items in the order information from the POS system.

2. A method for ordering a food item, comprising:
    a) reading tag information corresponding to one of tags in a menu by an antenna of a Radio-Frequency Identification (RFID) module, each of the tags representing a food item on the menu;
    b) transmitting, by a mobile terminal, the tag information to an Object Directory Service (ODS) server to cause the ODS server to provide Object Identification Service (OIS) address and a service Uniform Resource Locator (URL) to a relay server, and to cause the relay server to provide the service URL to the mobile terminal;
    c) accessing, by the mobile terminal, a main server through the service URL to receive product information of a food item corresponding to the tag information from the main server;
    d) filling out a number of the food product corresponding to the product information and transmitting an order request message including the number of the food product to the main server by the mobile terminal to cause:
        the main server to send order information corresponding to the order request message to a point of sale (POS) system, and
        the POS system to generate an order list including the food item according to a sequence in which payment is completed and send the order list to a kitchen server for preparation of the food item;
    e) receiving, by the mobile terminal, the order list from the POS system for display on the mobile terminal; and
    f) receive a guide message indicating completion of one or more food items in the order information from the POS system.

3. The method of claim 1, further comprising sending a selection on payment for the order request message by the mobile terminal to cause the main server to perform payment operation on the one or more food items.

4. The method of claim 3, wherein the guide message is received after the payment operation is finished by the main server.

5. The method of claim 1, wherein the guide message comprising at least one of a text message, a voice message or a multimedia message.

* * * * *